F. A. JIMERSON.
PNEUMATIC HOSE COUPLING.
APPLICATION FILED NOV. 9, 1920.

1,430,558.

Patented Oct. 3, 1922.

INVENTOR
Francis A. Jimerson
BY
Herbert L. Ogden
his ATTORNEY

Patented Oct. 3, 1922.

1,430,558

UNITED STATES PATENT OFFICE.

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

PNEUMATIC-HOSE COUPLING.

Application filed November 9, 1920. Serial No. 422,847.

*To all whom it may concern:*

Be it known that I, FRANCIS A. JIMERSON, a citizen of the United States, a resident of Athens, county of Bradford, State of Pennsylvania, have invented certain new and useful Improvements in Pneumatic-Hose Couplings, of which the following is a specification.

This invention relates to pneumatic hose couplings of the type in which male and female hose ends are adapted to be locked together by inserting the male hose end in the female hose end, and then turning one relatively to the other so that lugs or projections on one engage lugs or projections on the other and the members become locked by means of spring pressure.

The primary objects of the present invention are to secure a firm and durable lock between the male and female members, effectually prevent leakage, especially under high pressures at the coupling, permit locking and unlocking to be quickly and readily accomplished, and produce a strong coupling which will withstand rough usage without breakage, and thus among other obvious advantages, reduce the liability of accidents.

To these ends the invention is illustrated in one of its preferred forms in the accompanying drawings, in which—

Figure 1:
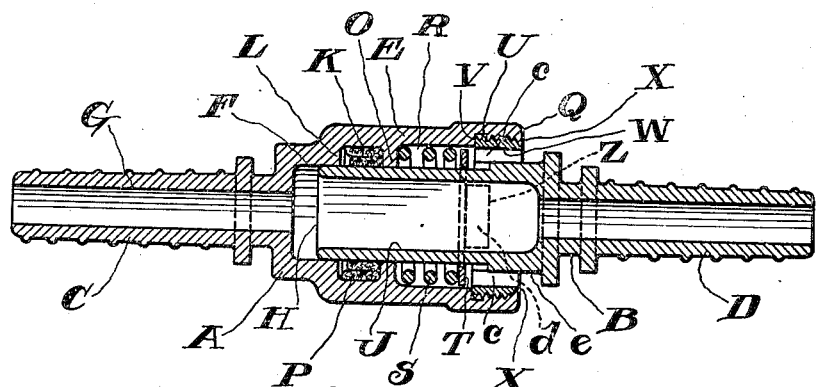
Figure 2:
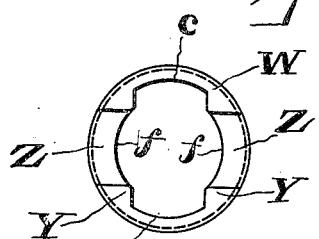
Figures 3, 4:
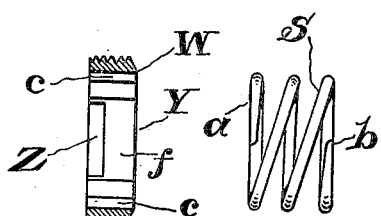
Figure 5:
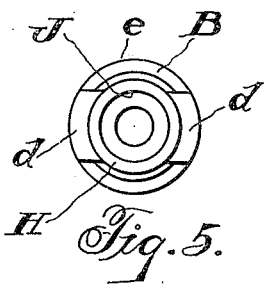
Figure 6:
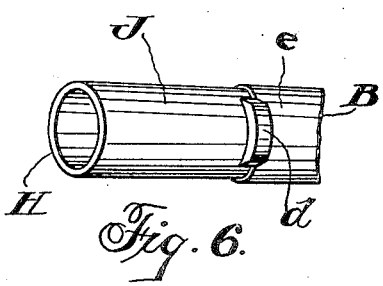

Figure 1 is a longitudinal sectional elevation taken through the assembled hose coupling, Figure 2, is a face view of the inner face of the coupling nut in the head of the female hose end, Figure 3 is a vertical sectional view of the nut, Figure 4 is a side view of the coupling spring, Figure 5 is an end view of the male hose end taken from the nipple end, and Figure 6 is a detail perspective view partly broken away of the nipple end of the male hose end.

Referring to the drawing, the coupling comprises two principal members in the form of a female hose end A and a male hose end B. Each member is provided with a reduced neck C and D respectively for the attachment of hose sections in the usual manner and the male hose end is adapted to be inserted and locked in the female hose end.

The female hose end is provided with an enlarged coupling head E formed with an internal receiving and guiding socket F in its base, larger in diameter than the bore G of the reduced neck C and this socket F is for the purpose of receiving the tip H of the nipple J of the male hose end B. The head E is also formed with an annular gasket receiving recess K of larger diameter than the bore of the receiving socket F, located adjacent said socket and between the outer shoulder L of said socket and an internal flange O in the head E, the said flange O being of substantially the same bore as the diameter of the socket F, so that the flange also serves to guide the nipple J.

A suitable gasket P, preferably of rubber, is arranged in the recess K and in this instance the gasket is doubled circumferentially into U shaped form and located in the recess K with the fold towards the mouth Q of the head E. A gasket so folded tends to expand under fluid pressure and forms a tight seal between the head and the nipple.

A spring receiving chamber R is formed in the head E between the gasket flange O and the mouth Q of the head, and a coiled spring S is seated on the gasket flange O in said spring chamber. A loose washer T is arranged over the outer end of the spring. The spring S shown as a coiled spring may be made of any suitable material, preferably of bronze wire and the ends $a$ and $b$ of the spring should preferably be squared as indicated in Figure 4, in order to more perfectly lie in the spring recess R between the flange O and washer T. The hose coupling washer T may also be formed from suitable material, preferably of steel in order to withstand wear and all fins and burrs should be removed from the washer and the washer should be flat and not warped out of shape. Such details and niceties of construction aid in producing an efficient and tight coupling for air under pressure.

The mouth Q of the head E is formed with an enlarged internally screw threaded bore U forming a seating shoulder V at the outer end of the spring receiving chamber R, and a coupling nut W is threaded into said enlarged bore U and seated on the seating shoulder V. Means are provided for locking the coupling nut W in the mouth of the head E and in this instance the top X of the threads at the mouth of the head are rolled over the nut as indicated in Figure 1 to lock the nut in position. The said coupling nut W is formed with inwardly projecting lugs Y having under-cut or recessed portions Z and spaces c between the lugs.

The male hose end B is adapted to enter the female hose end as shown and is provided with locking lugs d at the base of the nipple J adapted to be inserted in the spaces c in the coupling nut W, and as the male hose end is forced into the female hose end the lugs d of the male end bear on the washer T and compress the spring S, until the lugs d may be turned or twisted into engagement with the under-cut portions Z of the lugs Y on the coupling nut W, in which case the spring and washer lock and maintain the lugs d in engagement with the lugs on the coupling nut until it is desired to disconnect the hose ends.

When the male and female hose ends are assembled in locked position the barrel portion e of the male hose end B is adapted to bear against the opposed internal faces f of the lugs Y on the coupling nut W so that the male hose end has a bearing in the head E of the female hose end against the walls of the receiving socket F at one end and against the internal faces f of the lugs Y in the coupling nut W at the other end. There is also a bearing forming a guide between the gasket flange O and the nipple J of the male hose end. By this construction the male hose end has three bearings in the head of the female hose end and in addition is effectually sealed by the folded gasket and locked in position by means of the spring and washer.

I claim:

1. A pneumatic hose coupling comprising a female hose end having a reduced neck for the attachment of a hose and an enlarged coupling head formed with a socket in its base for receiving the nipple of a male hose end, a gasket receiving recess between said socket and an internal flange, a gasket in said recess, a spring receiving chamber between said gasket flange and the mouth of the head, a coiled spring in said chamber, a washer over said spring, a coupling nut secured and locked in the mouth of said head, said nut having diametrically opposite undercut lugs and recesses between the lugs, a male hose end adapted to enter the female hose end and having a reduced neck for the attachment of a hose and a nipple provided with lugs at its base adapted to be seated in the under-cut portions of the lugs on the nut in the head of the female hose end, said washer bearing directly against the ends of said nipple lugs and said nipple being locked in position by the expansive force of said spring.

2. A pneumatic hose coupling comprising a female hose end having a reduced neck for the attachment of a hose and an enlarged coupling head formed with a socket in its base for receiving the nipple of a male hose end, a gasket receiving recess of larger diameter than the bore of said socket between said socket and an internal flange in the head, a gasket in said recess, a spring receiving chamber between said gasket flange and the mouth of the head, a coiled spring in said chamber bearing on said flange, a washer over the outer end of said spring, the mouth of the head having an enlarged bore, a coupling nut secured in said bore and locked in position, said nut being formed with under-cut inwardly projecting lugs, a male hose end having a neck for the attachment of a hose and a nipple adapted to enter the female hose end provided with lugs at its base adapted to be locked in the undercut portions of the lugs on the nut in the head of the female member, said washer bearing directly against said nipple lugs.

3. A pneumatic hose coupling comprising a female hose end having a hollow reduced neck for the attachment of a hose and an enlarged coupling head formed with an internal receiving and guiding socket in its base larger in diameter than the bore of the said reduced neck for receiving the tip of the nipple of a male hose end, an annular gasket receiving recess of larger diameter than the bore of the said receiving socket located adjacent said socket and between an outer shoulder of said socket and an internal flange in the head, said flange being of substantially the same bore as the diameter of the said socket, a rubber gasket doubled circumferentially into U shaped form and arranged in said gasket recess with the fold towards the mouth of said head, a spring receiving chamber between said gasket flange and the mouth of the head, a coiled spring seated in said flange in said chamber, a loose washer over the outer end of said spring, the mouth of the head having an enlarged internally screw threaded bore forming a seating shoulder at the outer end of the spring receiving chamber, a coupling nut threaded into said enlarged bore and seated on said seating shoulder, the top of said threads at the mouth of the head being rolled over the nut to lock it in position, and said nut being formed with inwardly projecting undercut lugs, a male hose end adapted to enter the female hose end and having a neck for the attachment of a hose and a nipple provided with lugs at its base, the nipple being received and guided in the socket in the base of the enlarged coupling head of the female hose end and sealed by the U gasket, and the lugs on the male hose end being adapted to be locked by the spring in the undercut lugs on the said nut at the mouth of the said coupling head, the spring pressed washer bearing directly against the lugs on said male hose end.

In testimony whereof I have signed this specification.

FRANCIS A. JIMERSON.